April 8, 1958 W. P. CARPENTER ET AL 2,830,232
ELECTRICAL CONTROL APPARATUS
Filed June 2, 1955
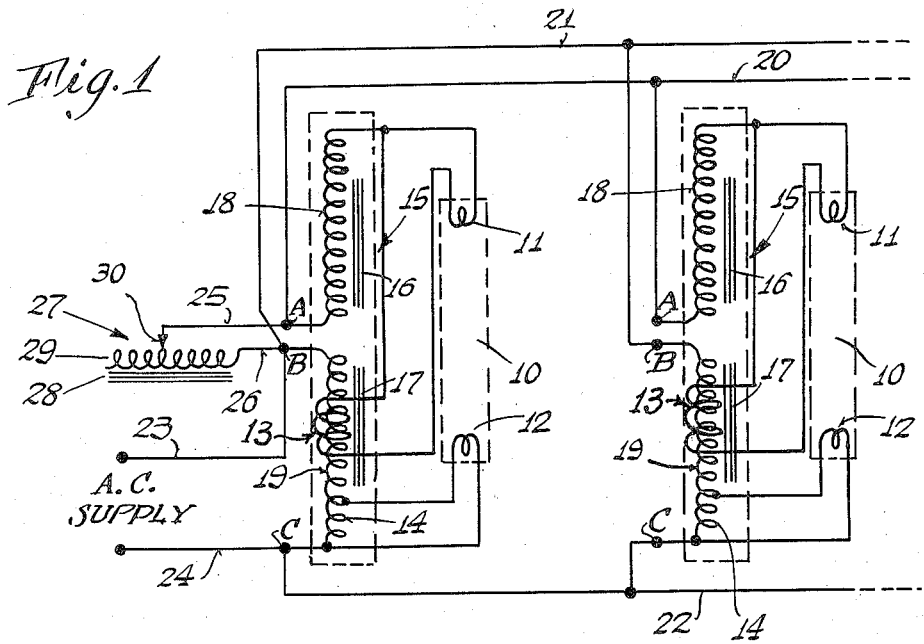
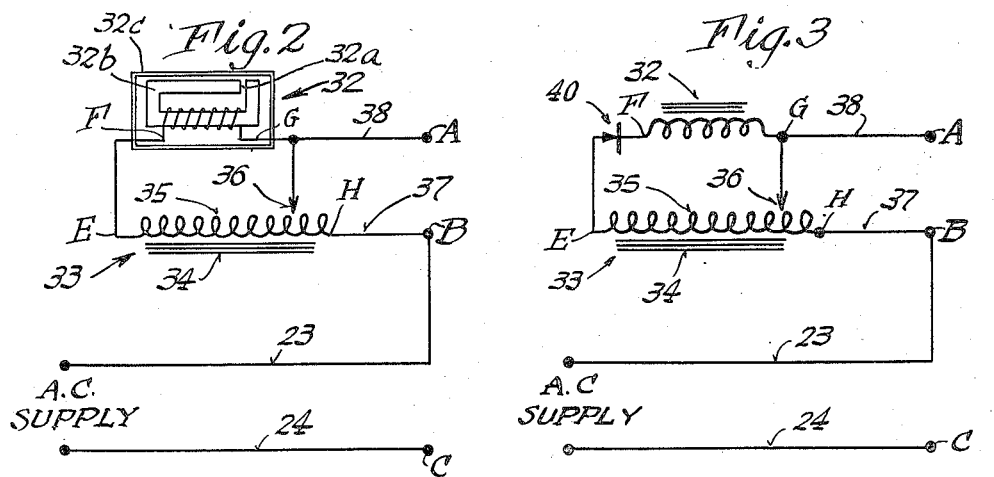
INVENTORS
William P. Carpenter
Gustav O. Fredrickson
BY
Johnson and Kline
ATTORNEYS

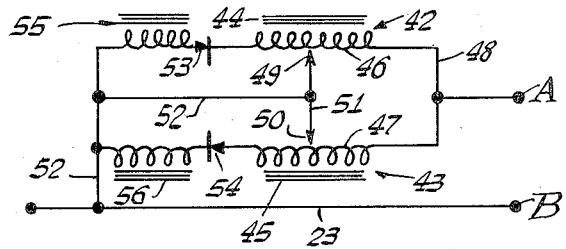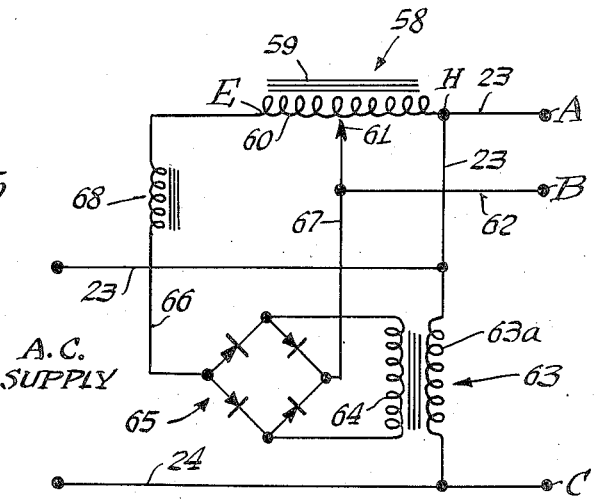

United States Patent Office 2,830,232
Patented Apr. 8, 1958

2,830,232

ELECTRICAL CONTROL APPARATUS

William P. Carpenter and Gustav O. Fredrickson, Bristol, Conn., assignors to The Superior Electric Co., Bristol, Conn., a corporation of Connecticut Application June 2, 1955, Serial No. 512,772

11 Claims. (Cl. 315—97)

This invention relates to the control of electrical energy, and more particularly to apparatus for controlling alternating electric current which is supplied to a load.

The invention is illustrated and described in connection with the control of fluorescent lamps (which have a negative resistance characteristic) for the purpose of changing the degree of brightness of the lamps; however, it should be understood that the invention is not limited to this particular application nor to electrical loads having negative resistance characteristics, since it has utility in the field of electrical controls generally. The scope of the invention is therefore to be considered as defined by the appended claims and not by the specific embodiments illustrated and described herein.

An object of the invention is to provide an improved electrical control apparatus for varying the energization of electrical loads, which apparatus is relatively simple, highly efficient in its operation so as to not introduce appreciable losses, and comparatively inexpensive to fabricate and manufacture.

A further object of the invention is to provide an electrical control device of the above type, which is easily and quickly adjusted or set to provide the different desired load currents or control of the load.

A still further object of the invention is to control an alternating electrical current with an improved apparatus which will function at all points of control without creating undesirable electromagnetic noises, or causing unreasonable heating of control brushes.

Still another object of the invention is to provide an improved electrical control apparatus in accordance with the above, which is rugged, durable and reliable in its operation, and which has an extended useful life before requiring servicing.

In accomplishing the above objects we provide a control device embodying, as one of its main components, a variable saturating inductor which is preferably of the type having an annular magnetic core and a toroidal winding carried by the core, said winding being arranged to enable, by a commutating action, the number of turns included in the circuit to be varied over a wide range. In some of the embodiments of the invention illustrated herein the inductor functions in the manner of an adjustable autotransformer, while in other embodiments it constitutes a saturating inductor wherein more or less turns may be connected in the circuit, the latter use being distinguished from saturable reactors of the type wherein the magnetism and/or saturation is controlled by varying the energization of a control winding.

We employ this saturating inductor, in the specific embodiments of the invention illustrated herein, in conjunction with rapid-start, hot-cathode fluorescent lamps which have their filaments continuously heated by a substantially constant voltage from ballast devices associated therewith, to effect dimming or brightening of the lamps, the inductor serving to vary the arc current between the lamps.

An important feature of the invention resides in the provision of novel means for reducing or minimizing localized heating in the inductors of our control apparatus.

Another feature of importance of the invention is a novel means of minimizing magnetic vibrations in the adjustable part of the circuit.

Still another feature of the invention is to provide dimming of fluorescent lamps with adjustment of luminosity at all points from a very low luminosity to maximum, with ability to start at any desired point of luminosity.

Other features and advantages will hereinafter appear.

In the accompanying drawings:

Figure 1 is a schematic diagram of a control apparatus embodying the invention, wherein a simple and effective control of a rapid-start fluorescent lamp load is obtained.

Fig. 2 is a schematic diagram illustrating another embodiment of the invention, wherein means are provided for minimizing localized heating of the saturating inductor of the control. Means are also provided to minimize electromagnetic generated noises. The circuit of Fig. 2 may be substituted for a portion of the circuit of Fig. 1, as indicated by the correspondingly-lettered terminals or connections.

Fig. 3 is a schematic diagram illustrating another embodiment of the invention by which localized heating is minimized, the circuit of Fig. 3 being also replaceable for a portion of the circuit of Fig. 1 as indicated by the lettered terminals.

Figs. 4, 5 and 6 are schematic diagrams illustrating still other embodiments of the invention, the circuits of these figures being substitutable for a portion of the circuit of Fig. 1 which is connected to the lettered terminals.

Fig. 7 is a diagrammatic view showing an annular form of reactor having a toroidal winding which is advantageously used in the systems of the present invention.

Referring to Fig. 1 there is shown a plurality of fluorescent lamps 10 of the rapid-start (not instant-start) hot-cathode type, having filaments 11 and 12 connected to heater windings 13 and 14 of ballasts 15. The heater windings by being energized by the primary winding 19 which is across the supply provides a substantially constant voltage and hence heating effect to the filaments 11 and 12 which is typical of conventional rapid start ballasts. The ballasts 15 comprise pairs of core sections 16, 17 having windings 18, 19 connected with the heater windings 13, 14 as shown. The ballast windings as thus set forth are loosely coupled, as is well understood in the art, and the windings 18, 19 and 14 have leads brought out respectively to terminals A, B and C.

In the operation of a plurality of fluorescent lamps, either the two shown or a greater number, all of the terminals A are connected together as by a wire 20, the terminals B connected together as by a wire 21 and the terminals C connected together as by a wire 22.

By the present invention we provide an improved control apparatus in conjunction with the ballasts 15 and the lamps 10, by which varying degrees of dimness or brightness of the lamps may be effected in extremely fine steps, the said control apparatus being effective to maintain constant the load current for any given setting and being relatively simple and economical to fabricate while at the same time highly efficient in its operation.

Referring to Fig. 1, current supply lines are indicated at 23 and 24, connected respectively to the terminals B and C. Between the terminals A and B we connect, by means of wires 25 and 26 a variable, saturating inductor 27 having an annular core indicated diagrammatically at 28 and having a toroidal winding 29 on said core. One end of the winding 29 is connected to the lead 26, and the lead 25 is connected to a means by which more or less of the coil convolutions may be included in the circuit. Such means, for example, may comprise a slider 30 bearing on bared portions of the coil 29. Other means may be provided, however. For example, a selector switch may be utilized, and taps may be brought from the coil 29 to the selector switch to provide for a stepped adjustment by which different numbers of coil convolutions may be included in the circuit.

The inductor 27 is so arranged that the core 28 thereof is at the saturation point for all positions of the slider 30 as long as active turns of the winding are in the circuit. By this organization we provide an efficient, adjustable control of current between the terminals A and B, by which variation may be had of the energy supplied to the fluorescent lamps 10.

The operation of the control and lamp circuit shown in Fig. 1 is as follows: Consider the slider 30 as being at the rightmost end of the coil 29. When energy is first supplied to the leads 23 and 24 the lamps 10 will not be imposing any load on the ballast 15 except that imposed by filaments 11 and 12. Accordingly, by virtue of the inductive relationship of the coils 18 and 19 together with the energization of the coil 19 from the supply lines 23, 24, a relatively high voltage will be established between the filaments 11 and 12. Also, due to the energization of the coils 18 and 19 the filaments will become heated, and under these conditions the lamps will flash and become luminous.

As soon as flashover is established in the lamps they impose a load on the ballasts 15, and as in the case of an electric arc, the said load has a negatve voltage-current characteristic whereby the voltage decreases with increases in current, and vice-versa.

The load imposed by the lamps 10 will, by virtue of the loose coupling between the coils 18 and 19, greatly reduce the voltage existing between the filaments 11 and 12. Whereas at the start the voltage between the filaments may be on the order of 230 volts, this starting voltage is depressed to an operating value in the neighborhood of 100 volts. However the voltage on the filaments remains substantially constant to provide for continuous heating thereof.

The slider 30 of the variable inductor 27 may be at any desired position on the coil 29. When shifted to the right from the position shown in Fig. 1 it will have the effect of conducting more current between the terminals A and B; when shifted to the left it will have the effect of conducting less current between the terminals A and B. Thus the degree of brightness of the lamps 10 may be varied by adjustment of the slide 30, and as varied will be maintained automatically by the functioning of the inductor 27.

Since the core is normally saturated, the absorption of voltage by the inductor is a function of the number of active turns, and hence is largely inductive and only in small part resistive. Accordingly there is relatively little heat generated in the inductor or energy wasted by it. By arranging the inductor 27 so that, for both the maximum and minimum number of lamps which it is to control, there is saturation of the core 28, the change in load voltage with changes in load is held to a minimum. Thus, the control system of this invention as illustrated in Fig. 1 basically operates, for any of its adjusted settings, to maintain steady the load voltage even though the load be made to vary between wide limits.

Where the adjustable inductor 27 has the form in which a slider passes over bared portions of the coil, there occurs a short circuiting of one or more coil convolutions by the brush or contact member of the slider. These short-circuited convolutions have circulating currents which pass through the brush and cause a localized heating thereof. The circulating currents are a function of the turn-to-turn voltage of the coil, and when the turn-to-turn voltage exceeds a certain value the localized heating may become excessive and require remedy. The rating of the inductor is limited by the extent of this localized heating, and the heating effect is greatest when the inductor is carrying the higher values of current, as when the slider 30 is near the rightmost end (as shown) of the coil 29.

In accordance with the present invention novel means are provided by which the localized heating at the brush may be reduced or minimized, thereby resulting in an increase in the capacity of the control and enabling a given size of inductor to handle a larger load or a greater number of lamp units. For this purpose, referring to Fig. 2, there is provided a saturating voltage-limiting inductor 32, in conjunction with a variable saturating inductor 33, said inductors being arranged for connection to the terminals A, B and C in place of the inductor 27, Fig. 1, for controlling the fluorescent lamps 10.

In Fig. 2, the supply lines 23 and 24 are arranged in the same manner as in Fig. 1. The inductor 33, Fig. 2, comprises an annular core 34, a toroidal coil 35 and a slider 36 engageable with various bared portions of the coil 35. One end of the coil 35 is connected by a lead 37 to terminal B, and the slider 36 is connected by a lead 38 to terminal A. The saturating inductor 32 is connected across the slider 36 and the other end E of the variable inductor 33. Thus parallel paths are formed, and the inductor 33 functions somewhat as an adjustable autotransformer. The saturating inductor 32 is so arranged that saturation occurs at a relatively low voltage, as for example in the neighborhood of 75 volts. We have found that by so doing, the inductor 32 tends to limit the maximum voltage across its ends F and G to that required for full saturation, after which it more strongly resists efforts to increase the voltage impressed on it.

When the slider 36 is at the extreme end E of the coil 35, for a given set of conditions there may be a voltage in the order of 170 volts across the extremities of the coil 35. Hence, the turn-to-turn voltage will be relatively low and there will not be excessive localized heating at the slider. Of course, the voltage across the inductor 32 will be virtually zero. When the slider 36 is at the end H of the coil 35 there will be direct conduction through the slider between the terminals A and B and virtually no current or voltage will exist in the inductors 32 and 33.

Considering the condition where the slider 36 is at the end E of the coil 35, as the slider is advanced toward the end H, an increased voltage will be manifested between the end E of the coil 35 and the slider, and this voltage will also be the voltage impressed on the inductor 32. During movement of the slider this voltage impressed on the inductor 32 will start at a point near zero and can be readily brought to a value of 75 volts, and while this is occurring the voltage between the slider 36 and the end H of the coil 35 diminishes, indicating that the control system 33 is absorbing less voltage between terminals A and B and that the terminals A and B are being brought closer together potentialwise.

As the slider 36 advances from the end E toward the end H the coil 35 of the inductor 33 will experience higher turn-to-turn voltage, resulting in more localized heat at the slider. However, after the slider 36 has reached a point where the voltage between it and the end E of the coil 35, i. e. the voltage across the inductor 32, reaches approximately 75, further movement of the slider toward the end H will not result in any appreciable increase of this voltage. Instead, the inductor 32 will constitute a load, and may be thought of as a load applied to an autotransformer in the form of the inductor 33. Such load will have the effect of limiting or preventing further increases in the turn-to-turn voltage of the coil 35 as the slider 36 is made to continue its movement toward the end H. The inductor 32 will tend to limit to a maximum of approximately 75 the voltage existing at any time between the slider 36 and the end E of the coil 35, even though the slider be made to approach the end H of the coil. Thus, by limiting the turn-to-turn voltage of the coil 35 for the higher current settings of the inductor 33 there is prevented overheating of the inductor at the brush or slider, enabling it to handle greater loads than would be otherwise possible. It will be understood that with the circuit of Fig. 2 a control is exercised over the voltage between the terminals A and B, by which dimming or brightening of the fluorescent lamps 10 may be readily and advantageously effected due to arc current changes.

Because the adjustable inductor 33 is operated virtually at the saturation point at most settings of the slider 36, the load current of a lamp 10 will remain substantially constant with changes in a number of lamps, for any given setting of the slider.

The use of the fixed inductor 32 in Fig. 2 has another advantage besides reducing heating of the brush, namely that of eliminating electromagnetically generated noises in the adjustable inductor 33. Since the fixed inductor 32 is connected from the slider 36 to the end E of the coil 35, the heavier currents are effectively carried between terminals A and B, without increasing the flux density to a point of noise generation in the inductor 33. The net magnetizing ampere turns in the core 34 due to load current between terminals A and B are equal to the difference of magnetizing ampere turns from the terminal H to the slider 36 and the ampere turns from the end E to the slider 36. Therefore, by using a fixed inductor 32 of a critical value, with respect to performance of the adjustable inductor 33, it is possible to reduce the maximum flux at any point of control to a reasonable and quiet value. To do this it was found advantageous to operate the fixed inductor 32 at heavy saturation and introduce an air gap 32a in the core 32b of the inductor 32. Although this tends to introduce noises in the core 32b, these can be effectively cushioned by a conventional noise damping mounting 32c for the inductor 32, since the latter has no adjustable moving parts. The net effect of the arrangement shown in Fig. 2 together with proper mounting of the inductor 32 is the production of a novel means of eliminating noise and brush heating while controlling alternating currents.

Since the slider 36, Fig. 2, travels from end E to end H in controlling alternating current from a minimum to a maximum, the end point of control when the brush is at the end E of the coil is not affected by using the reactor 32 since with the slider 36 at the end E the reactor 32 is completely shunted. Similarly when the slider 36 is at the end H complete shunting of current takes place from between terminals A and B. Therefore, end points of control of the arrangement shown in Fig. 2 are the same as those in Fig. 1 in which no fixed reactor is used.

Another embodiment of the invention is shown in Fig. 3. This figure is in many respects similar to that of Fig. 2, and like components have been given like characters. The difference between the circuits of Figs. 2 and 3 resides in the provision, in the circuit of Fig. 3, of a rectifier 40 connected between the inductor 32 and the end E of the coil 35 of the inductor 33.

The action of the circuit of Fig. 3 is similar to that of Fig. 2 except that the inductor 32 in Fig. 3 carries a unidirectional pulsating current constituting a half-wave, rectified alternating current. For the periods of non-conduction of the rectifier 40, during each one-half cycle of the alternating current of the source, the inductor 32 has no controlling influence, and may be thought of as being entirely absent. During the remaining half-cycle, the inductor 32 tends to function, together with the inductor 33, in the manner explained above in connection with Fig. 2. During the periods of non-conduction, the circuit of Fig. 3 functions essentially like that shown in Fig. 1. Because of this, in the control of fluorescent lights and with certain settings a flicker may be noticeable: however, where the control is utilized for other purposes, as with a resistive load, incandescent lamps, etc., this pulsating characteristic may not be a drawback and might even for certain applications prove to be advantageous. However, if the pulsating nature of the control effected by the circuit of Fig. 3 is objectionable it can be eliminated in the manner shown in Fig. 4.

In Fig. 4 the usual supply lines 23 and 24 are brought to the terminals B and C respectively. A pair of adjustable saturating inductors 42 and 43 is provided, having annular cores 44, 45 carrying toroidal coils 46, 47. The rightmost ends of the coils 46, 47 as seen in Fig. 4 are connected together by a wire 48 and connected to the terminal A. The inductors 42 and 43 have sliders 49 and 50 mechanically connected for movement in unison and respectively connected to each other by a wire 51 and to the supply line 23 by a wire 52. The remaining ends of the coils 46 and 47 are connected to oppositely-faced rectifiers 53 and 54 which join with saturating inductors 55 and 56 connected in turn to the wire 52 and supply line 23.

It will be noted that in Fig. 4 there is a duplication of the circuit of Fig. 3, and contains two rectifiers, two fixed saturating inductors and two adjustable saturating inductors. For those periods when one of the rectifiers 53 or 54 is not functioning the other will be functioning, and the full wave of the alternating current will be utilized, thereby avoiding any tendency toward pulsating, or flicker, when the system is utilized for controlling fluorescent lamps.

Another embodiment of the invention by which localized heating at the brush or slider of the variable inductor is reduced, is shown in Fig. 5. In this figure the A. C. supply leads 23 and 24 are connected respectively to the terminals A, C and an adjustable inductor 58 having an annular core 59 and toroidal coil 60 has one end of its coil connected to the lead 23. The inductor 58 has a slider 61 connected by a wire 62 to the terminal B, whereby the inductor bridges the terminals A and B as in the forms of the invention shown in Figs. 1 to 4 inclusive. In Fig. 5 a D. C. potential is provided from the voltage existing between the terminals A and C to produce a unidirectional flux in the core 59 of the inductor 58. As shown, a transformer 63 is utilized, having a primary 63a connected between the terminals A and C and having a secondary 64 connected to a rectifier bridge 65 which has output leads 66 and 67. The lead 67 is connected to the slider 61 of the reactor 58 and the lead 66 is connected through a current-limiting inductor or choke 68 to the end E of the inductor coil 60.

The circuit of Fig. 5 has the effect of decreasing heating of the short-circuited turns at the slider 61.

The effect of the D. C. energization of the coil 60 by the rectifier bridge 65 may be thought of as producing a flux in the core 59 which limits the turn-to-turn voltage of the coil 60 to a certain value, holding the heating effect at the slider 61 to a safe figure. It will also be observed that the rectifier bridge 65 and the choke 68 constitute a load across a portion of the saturating inductor 58, which thus functions as an autotransformer in this respect. The terminals A and B may be considered as constituting a source of E. M. F. which provides energization of the inductor 58 and results in a flux in the core 59 thereof, inducing an E. M. F. in the inductor coil 60.

The choke 68 additionally functions to limit the D. C. current and prevent overloading of the rectifiers when the slider 61 is shifted to the end E of the coil 60, since it provides an impedance across the output of the rectifier bridge 65.

The circuit of Fig. 5 may produce a flicker in fluorescent lamps being controlled by it, since for part of the cycle the alternating current in the coil 60 is acting in the same direction as the D. C. energization, whereas for another part of the cycle it is acting oppositely to the D. C. energization.

Another embodiment of the invention, along the lines of the circuit of Fig. 5, is shown in Fig. 6. The Fig. 6 circuit, however, is capable of handling larger loads, and also eliminates flicker. In this figure supply leads 23 and 24 are connected respectively to terminals A and C as in Fig. 5. A pair of adjustable saturating inductors 70 and 71 is provided, having cores 72, 73 and coils 74, 75, said coils being joined to the supply line 23 and being engaged by sliders 76, 77 mechanically connected for movement in unison and connected together by a wire 78. The wire 78 is joined by a lead 79 to the terminal B, and the primary coil 80 of a transformer 81 is connected between the terminals B and C. The secondary 82 of the transformer 81 is connected to a rectifier bridge 83 whose output is connected by wires 84 and 85 to the remaining ends of the coils 74 and 75. In the lead 84 a choke or saturating inductor 86 is provided.

With the circuit of Fig. 6 there is no flicker in the lamp load which is being controlled, since the current path between the terminals A and B may be through either the reactor coil 74 or the reactor coil 75, said coils being oppositely energized by D. C. from the bridge 83. Thus the A. C. current passing between the terminals A and B will, considering the D. C. flux set up by the coils by virtue of their energization from the bridge 83, take the easiest path, first through one coil and then the other.

The effect of the D. C. energization may be thought of as providing a unidirectional flux in the inductors 70 and 71 which limits the turn-to-turn voltage of the inductor coils 74 and 75 to a value such that there is prevented excessive heating at the brushes or sliders 76, 77, this also being true for the circuit of Fig. 5.

In the above circuits the operation of the adjustable saturable inductors at or near the saturation point provides for substantially constant load voltage regardless of changes in loads, as already mentioned above in connection with Fig. 1.

In Fig. 7 there is schematically shown an adjustable inductor which, it has been found, may advantageously be employed in the controls of this invention for the inductor 33 as well as for the inductors 27, 42, 43, 58, 70 and 71. As shown, the inductor has an annular core 34 carrying a toroidal winding 35, the ends E and H of which are in the form of binding posts. The slider 36 is mounted on an arm 36a carried by a shaft 36b to rotatably move the slider over the turns of the windings 35. The slider has a contact 36c engaging a collector ring 36d connected to a binding post 36e which, in the form of the invention shown in Fig. 2, would be connected to the wire 38.

In practicing the forms of the invention shown in Figs. 4 and 6, two inductors, such as shown in Fig. 7, would be coupled through their shaft 36b for instance, for simultaneous coordinate movement.

By the present invention we have provided, as set forth above, improved control means by which the energization of electrical loads may be closely controlled with relatively simple and inexpensive equipment, said control means exhibiting close regulation whereby the current for any setting is maintained substantially constant despite changes in the load. The present improved control means does not utilize vacuum tubes and is accordingly in this respect much more rugged and able to withstand adverse operating conditions, and less costly to produce.

Variations and modifications may be made within the scope of the claims and portions of the improvements may be used without others.

We claim:

1. An adjustable intensity lighting circuit comprising at least one fluorescent lamp having a pair of filaments, ballast means for continually heating the filaments and providing an impedance during operation of the lamp, and adjustable reactor means including a winding wound on a magnetic core and a tap operable on the winding for adjusting the arc current flow between the filaments and hence the intensity of the lamp.

2. An adjustable intensity lighting circuit comprising at least one fluorescent lamp having a pair of filaments, ballast means for continually heating the filaments and providing an impedance during operation of the lamp, adjustable reactor means including a winding wound on a magnetic core and a tap operable on the winding for adjusting the arc current flow between the filaments and hence the intensity of the lamp, and means for limiting the voltage between adjacent convolutions of the winding for the higher output settings of the reactor comprising a saturating inductor connected to parallel at least a portion of the winding, said inductor becoming saturated at an intermediate setting of the tap on the winding.

3. The invention as defined in claim 2, in which there is a rectifier connected in series with the saturating inductor providing for unidirectional energization thereof.

4. The invention as defined in claim 2, in which the adjustable reactor means further includes a second winding wound on a magnetic core and a tap operable on the winding, means for operating both taps simultaneously, and connections connecting in parallel said windings.

5. The invention as defined in claim 2, in which the adjustable reactor means further includes means connected to a source of electrical energy for providing a unidirectional flux in the saturating inductor to cause saturation thereof.

6. An adjustable intensity lighting circuit comprising at least one fluorescent lamp having a pair of filaments, ballast means for continually heating the filaments and providing an impedance during operation of the lamp, and adjustable reactor means including a winding wound on a magnetic core, a tap adjustable on the winding, connecting leads connected to one end of the winding and to the tap and an inductor connected between the tap and the other end of the winding, to adjust the arc current flow between the filaments and thereby control the intensity of the lamp.

7. An adjustable intensity lighting circuit comprising more than one fluorescent lamp, with each lamp having a pair of filaments; ballast means for each lamp for continually heating the filaments and including an impedance means operable during operation of the lamp to limit the arc current; circuit means connecting the ballasts in parallel to a source of electrical energy; and a single adjustable reactor connected in the circuit to be in series with each impedance means for adjusting the arc current flow between the filaments.

8. An adjustable intensity lighting circuit comprising more than one fluorescent lamp, with each having a pair of filaments; ballast means for each lamp for continually heating the filaments and including an impedance means operable during operation of the lamp to limit the arc current; circuit means connecting the ballasts in parallel to a source of electrical energy; and adjustable reactor means consisting of a winding wound on a magnetic core, a tap adjustable on the winding, connecting leads connected to one end of the winding and to the tap and an inductor connected between the tap and the other end of the winding, to adjust the arc current flow between the filaments and thereby control the intensity of the lamps.

9. An adjustable reactor device comprising a coil wound on a core, a communicating surface on said coil, a brush slidable on the coil and engageable with at least two turns thereof; and a saturating inductor connected to parallel at least a portion of the coil, said saturating inductor becoming saturated at an intermediate setting of the brush on the coil and limiting the turn-to-turn voltage across the turns of the coil.

10. The invention as defined in claim 9 in which there is a rectifier connected in series with the saturating inductor providing for unidirectional energization thereof.

11. The invention as defined in claim 10 in which there are connections connecting the inductor and rectifier to a source of electrical energy to thereby cause saturation of the inductor.

References Cited in the file of this patent

UNITED STATES PATENTS

| | | |
|---|---|---|
| 602,963 | Thomson | Apr. 26, 1898 |
| 2,009,787 | Rypinski | July 30, 1935 |
| 2,040,684 | Boyajian | May 12, 1936 |
| 2,458,277 | Lark et al. | Jan. 4, 1949 |
| 2,665,394 | Arvidsson et al. | Jan. 5, 1954 |
| 2,683,241 | Passmore | July 6, 1954 |
| 2,729,752 | Seeger | Jan. 3, 1956 |